United States Patent [19]

Sandels

[11] Patent Number: 4,881,847
[45] Date of Patent: Nov. 21, 1989

[54] ARTIFICIAL WATER LAGOONS

[76] Inventor: Claes M. C. Sandels, Sandhamnsgatan 21, S-115 40 Stockholm, Sweden

[21] Appl. No.: 937,023

[22] Filed: Dec. 1, 1986

[30] Foreign Application Priority Data

Dec. 9, 1985 [SE] Sweden .............................. 8505812-1

[51] Int. Cl.⁴ ........................... E02B 3/00; E02B 5/04
[52] U.S. Cl. ....................................... 405/52; 405/63; 405/70
[58] Field of Search ....................... 405/52, 30, 31, 32, 405/29, 107, 63, 70, 71

[56] References Cited

U.S. PATENT DOCUMENTS

| | | | |
|---|---|---|---|
| 1,870,154 | 8/1932 | Wehr | 405/31 |
| 2,827,268 | 3/1958 | Staaf | 405/52 X |
| 3,011,316 | 12/1961 | Wilson | 405/28 |
| 3,061,276 | 10/1962 | Homan | 405/52 X |
| 3,214,916 | 11/1965 | Martin | 405/28 |
| 3,640,073 | 2/1972 | Sansel | 405/70 |
| 3,691,773 | 9/1972 | Ruhlman | 405/70 |
| 3,997,112 | 12/1976 | St. Clair | 405/52 X |
| 4,033,137 | 7/1977 | Geist | 405/71 |
| 4,201,495 | 5/1980 | Preus | 405/63 |
| 4,377,477 | 3/1983 | Dunkers | 405/52 X |
| 4,455,226 | 6/1984 | Lahav | 405/52 X |

FOREIGN PATENT DOCUMENTS

| | | | |
|---|---|---|---|
| 0800308 | 1/1981 | U.S.S.R. | 405/52 |
| 0958580 | 9/1982 | U.S.S.R. | 405/52 |

*Primary Examiner*—Dennis L. Taylor
*Attorney, Agent, or Firm*—Claes Magnus & Carl Sandels

[57] ABSTRACT

An arrangement to increase (or decrease) the temperature in sea or lake water within a limited area.

The arrangement is constituted by a basin (F, P1-P4, V1-V3, N1-N3 etc.) which is constructed and located in the sea water which temperature is desired increased. The basin shall primarily make the water circulation difficult between the basin and the outer sea so that a temperature difference is achieved, but it is not fully tight to allow a certain circulation. In one model (FIG. 1) the water circulation is uncontrolled with firm and statically arranged elements (YP1-YP3, HP1-HP7, E1-E10). In another model (FIG. 5) the elements of the basin (J1-E10). In another model (FIG. 5) the elements of the basin (J1-J3) are operated with regard to a temperature aimed at. Several more models (FIG. 8, FIG. 9, FIG. 12 etc.) are described.

11 Claims, 6 Drawing Sheets

ARTIFICIAL WATER LAGOONS

FIELD OF THE INVENTION

The present invention relates to an arrangement for increasing or decreasing the temperature in sea or lake water within a limited area, a basin of water, in which the water has a constant higher or lower temperature than the sea or lake has outside the basin. By the arrangement the exchange of water between the outer water and the water inside the arrangement can be decreased and/or controlled. The arrangement includes a part of the water of the sea or lake.

DESCRIPTION OF PRIOR ART

Previously known methods of tempering sea water are to build certain basins, pump the water into those and heat or cool the water to the temperature desired. This method is expensive in the view of both investments and running. Just to heat one cubic meter of water 1 degree Celsius consumes 100 kcal, equivalent to 1,16 kWh. The advantage, however, is that it is always possible to count down achieving the exact temperature independent of the temperature in the water or in the air.

SUMMARY OF THE INVENTION

The following invention is based on the fact that surface water always has a temperature which is closer to the temperature in the air than lower, situated water masses. Also water can be layered with different temperatures. By making it more difficult and/or regulate the natural water circulation within a limited area, preferably in connection to a shore, one will achieve a temperature in the water within the arrangement which is closer to the temperature in the air than in the sea or lake for the rest.

The object with the invention is to achieve, at a comparatively low investment and running cost, a more favourable temperature for swimming and farming of plants and animals. In most cases it would be the increased temperature effects which are sought by the invention can also be used of in the opposite direction, namely to decrease the temperature compared to the surrounding sea if the wind and the water streams will give the possibilities. The arrangement can in that respect be designed in various manners and is characterized as it will appear from the appended claims.

BRIEF DESCRIPTION OF THE DRAWINGS

The invention will be more described with reference to enclosed drawings where

FIG. 11a and b show the rolling wall according to the arrows C—C resp. D—D in FIG. 10;

DESCRIPTION OF THE PREFERRED EMBODIMENTS

The arrangement according to the first embodiment is easily assembled and disassembled. According to FIG. 1 the arrangement consists of a number of floatable elements E1 to E10, more or less pervious to water (porous), hard or soft. They are held together laterally by profiles, in this example by H-profiles HP1–HP7 in which the elements E1, E2 to E10 are allowed to move up and down according to water level and waves that make the waterline move. The H-profile can be substituted by any other profile whatever but then a corresponding cut out must be done in the elements so that they still are able to move up and down easily. To achieve deflection at right angles Y-profiles YP1 and YP2 are used. To achieve that the construction is held together laterally, the H and Y profiles should not be allowed to move. Therefore they are held together, in constant distances, by stays or wires at minimum two levels, for instance close to the water surface and close to the bottom. The surrounding surfaces of the H-profile, covering the elements, may be angled different to obtain a border line which will not only be a straight line.

Figure 1:
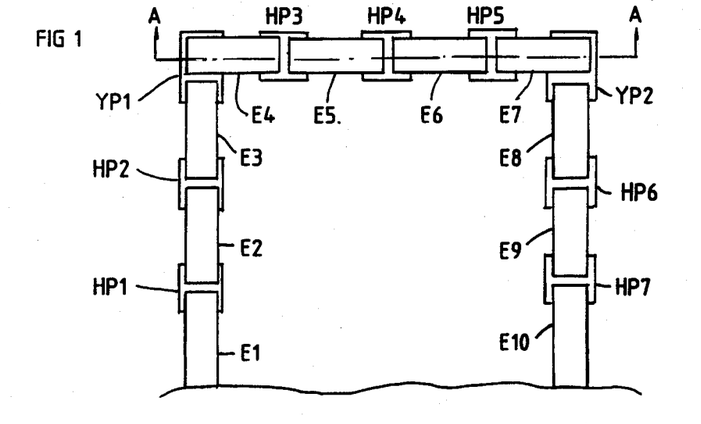
FIG. 1 shows the arrangement according to the invention from above in a first embodiment.
Figure 2:
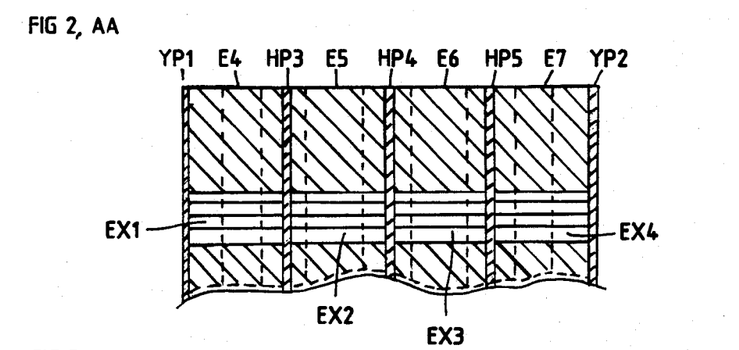
FIG. 2 shows a cross section of the arrangement according to FIG. 1.
Figure 3:
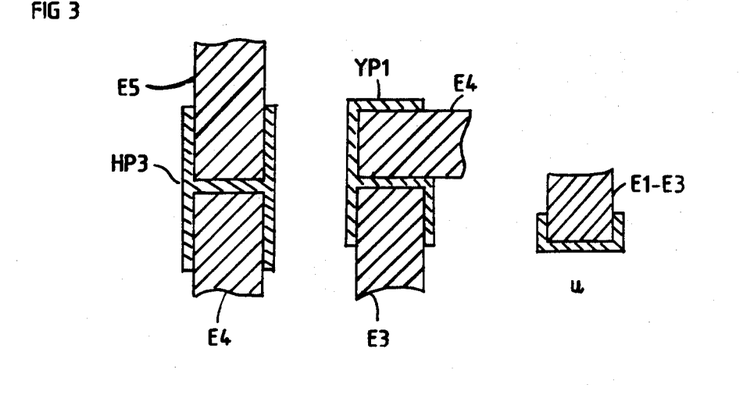
FIG. 3 shows the appearance of the H, Y and U profiles in cross section mentioned in the text below and in the embodiment according to FIG. 1.

FIG. 2 shows a cross section according to the arrows in FIG. 1. Between the porous elements there are certain expansion elements EX1–EX4 in which the porous elements are fastened. The expansion elements are placed with regard to the actual temperature- and streaming conditions at the place for the installation. An expansion element can assure different heights, type bellow, as shown in FIG. 2.

The porous elements, most close to the bottom, have been cut out in the lower part in that shape that they precisely follow the U-profile in which they are mounted and the U-profile has been shaped according to the bottom line where the bottom part of the arrangement advances. The porous material of which the elements are made from can favourably be soft enough to be rolled on big rolls. Thereafter such big pieces in exact dimensions can be cut which are needed for just that installation which is going to be built. The U- profile is fastened to the bottom, in loose bottom by, for instance, expansion brackets, in bottoms of rock by, for instance, rivets or moulding.

The arrangement according to this first embodiment must not be absolutely tight in all joints which hold it together. It allows, already according to the inventive idea, that water is to be exchanged between the fenced area and the surrounding water. The water shall be renewed within the arrangement all the time but in a considerable slower rate compared to if the arrangement had not existed. The air, with its temperature, will get a less amount of water to heat which instead will raise the temperature of the water which is inside the arrangement.

Figure 4:
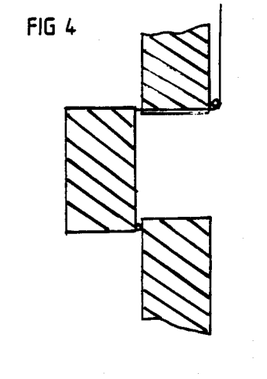
FIG. 4 shows an openable gate in the embodiment according to FIG. 1.

The degree of the desired difference of temperature and the water exchange determines the porosity and thickness which the element should have. If it is desired to have a quicker exchange of water within the arrangement, the elements can be equipped with gates which can be opened. They can be made by more or less porous material. They can be opened or shut by, for instance, wires according to FIG. 4. The whole arrangement can be stayed by wires, like a tent, as much as the wind and wave conditions require.

Figure 5:
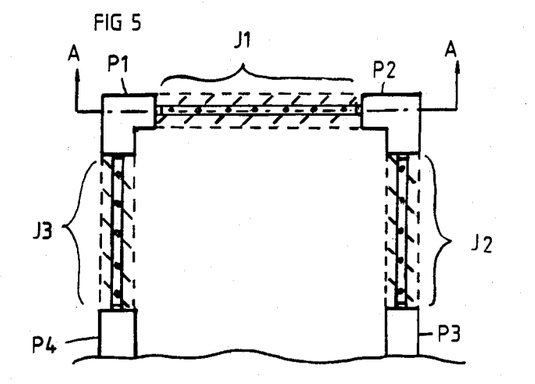
FIG. 5 shows the arrangement according to the invention in a second embodiment, as seen from above.
Figure 6:
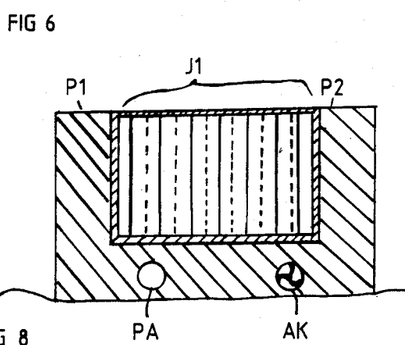
FIG. 6 shows this embodiment in a cross section according to the arrows in FIG. 5.
Figure 7:
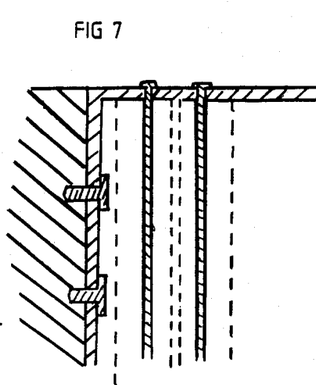
FIG. 7 shows a detailed picture of the jalousie gates in the embodiment according to FIG. 5.

According to the second embodiment, a frame on the bottom is built (possibly a complete foundation) from which columns are rising towards the water surface. The number of columns is dependent on the size of the arrangement and the stability required with regard to the wind and wave conditions at the place. In FIG. 5 there is shown an arrangement with four columns, P1, P2, P3 and P4. The height of the columns should be as great as the highest, expected water level. Even if the water level periodically could exceed the height of the columns and thereby surface water would come into the arrangement uncontrollably much, this does not harm. No damages occur. Most often it is surface water which has the temperature which is the most wanted for the fenced area. Between the columns P1 and P2 there is a frame in which a set of revolving plates J1 are mounted. In the same way, between the columns P1-P4 and P2-P3, there are frames J3 and J2 mounted. The columns P1-P4 are made of a very hard and firm material where, however, the most upper part can be made of the same or other material as the lower part and it can be removed in case there are severe ice conditions in the winter. These upper parts can then be removed. FIG. 6 shows a cross section of the arrangement according to the arrows in FIG. 5. The collection of plates J1-J3 forms a jalousie which can be adjusted to the previousity wanted. The jalousie can be lateral or vertical and is shown here with the turning axes vertical. Practically one has a regulating range from full opening to almost closed position. Any requirement for absolute tightness is not at hand since a certain exchange between the water of the arrangement and the sea should take place. The plates can be turned manually or with one engine per section or one engine for all sections simultaneously. The arrangement can have one or several sections of this gate system. With section, it is understood, is the area which is limited by two vertical columns between which the frame with the turning plates are situated. The arrangement can be equipped by a draining valve close to the bottom. There can be one or more such valves, passive or active, depending on the speed one wants to evacuate or to take in water. The direction determines whether the water which is at the bottom has an undesired temperature or if it has the desired temperature inside the arrangement. In the first case the draining hole should evacuate the water inside the arrangement, in the latter case the hole should let the water into the arrangement. In FIG. 6 there are shown one passive hole PA and one active AK.

Figure 8:
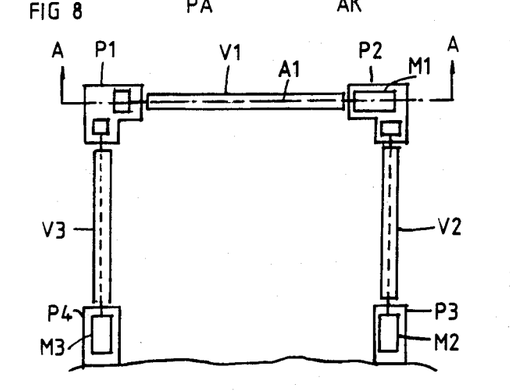
FIG. 8 shows the arrangement according to the invention in a third embodiment seen from above.

According to a third embodiment there is a frame built on the bottom (possibly a complete foundation) from which columns rise towards the water surface. The number of columns is dependent on the size of the arrangement and the stability which is required with regard to wind and wave conditions at the place. In FIG. 8, an arrangement is shown and four columns P1-P4. The height of the columns should be as great as the highest, expected water level. Even if the water level sometimes should exceed the height of the columns and thereby surface water would come into the arrangement uncontrollably much, this does not harm. No damage occurs. Most often it is the surface water which has the temperature which is the most desirable for the fenced area. According to FIG. 8 and FIG. 9 there are two axes A1-A2 mounted between the columns P1 and P2, one A1 at the water surface and one A2 down at the foundation. The columns are made of a very hard and firm material where, however, the most upper part can be made of the same or other material than the lower part and it could be detachable (if the ice conditions are troublesome).

The frame could, instead of holding the axes horizontally, hold them vertically. In FIG. 8, however, the axes are shown horizontally, with a mobile wall V between them. In the mobile wall V, which is made of a soft, water proof and strong material, i.e. rubber or plastic, there are a number of holes H1-H3. These holes are situated, according to FIG. 9, in a horizontal line but could be placed in any other formation whatsoever if the specific temperature and stream conditions so command. Normally the holes H1-H3 shall be placed in the vicinity of the water surface or rolled up on the axis so that no water exchange will occur. The construction gives a possibility for water exchange at other levels if the situation of temperature is such. There must be that much material on both sides of the holes H1—H3 that these holes could be placed at one's own discretion by moving the wall down and up.

Figure 9:
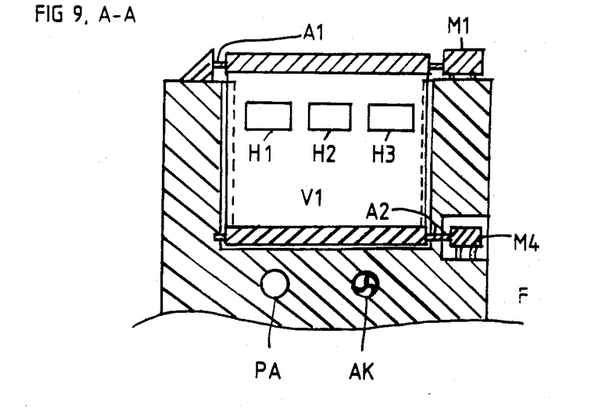
FIG. 9 shows this in a cross section according to the arrows in FIG. 8.
Figure 10:
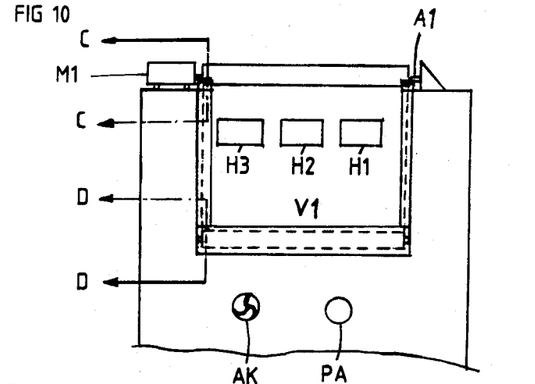
FIG. 10 shows a rolling wall from the front used in the embodiment according to FIG. 8.
Figure 11:
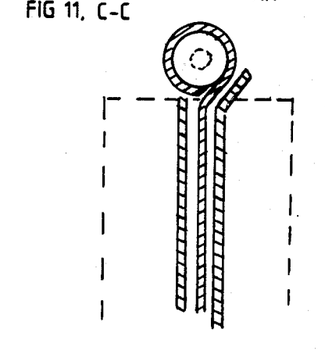
Figure 11B:
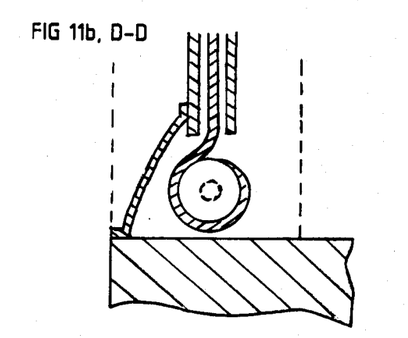

The mobile walls V1-V3 can be operated by being rolled up or down manually or by the motors M1-M3. The arrangement can be added by temperature gauges at one or several spots outside the walls. The position of the holes will be in front of the water layers which have the most suitable temperature for the arrangement. The arrangement can be made fully automatic if a computer will process the information from the temperature gauges and direct the motors which turns the axes on which the wall rolls.

The arrangement can be equipped with a draining hole close to the bottom. There can be one or several, passsive or active, depending on the speed one wants to evacuate or take in the water. The direction is determined of if the water close to the bottom has a desired temperature within the arrangement or if it has a not desired temperature. In the first case the hole should take in water to the arrangement, in the last case the hole should evacuate the water which is inside the arrangement or be closed. In FIG. 9 a passive hole PA and an active hole AK are shown.

The arrangement according to FIG. 8 is shown with four columns and three mobile walls, of which one has been shown in FIG. 9. The arrangement according to the invention in this embodiment can be equipped with as many columns as desired with the described walls between them.

Figure 12:
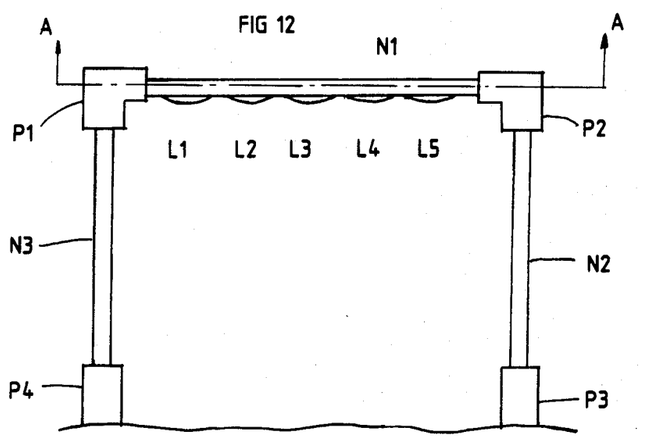
FIG. 12 shows the arrangement according to the invention in a fourth embodiment, seen from above.
Figure 13:
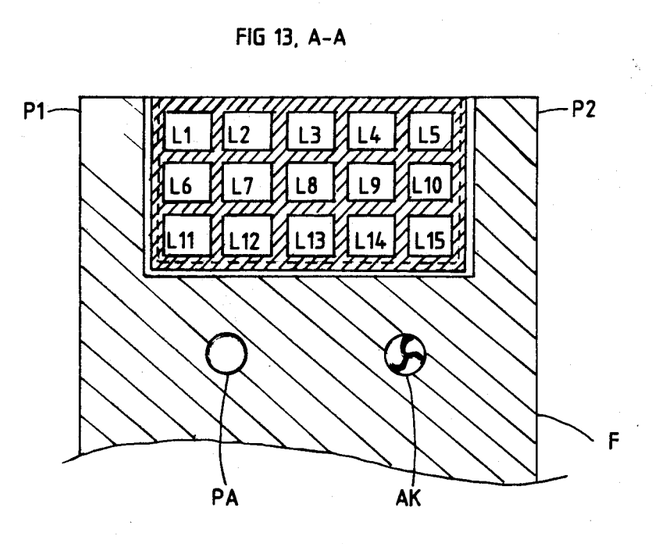
FIG. 13 shows it in a cross section according to the arrows A—A in FIG. 12.
Figure 14:
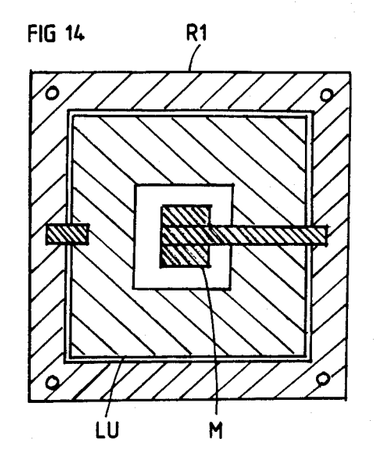
FIG. 14 shows a module with a frame, gate and motor in a cross section.

According to a fourth embodiment a frame is built on the bottom (possibly a complete foundation) from which columns P1-P4 are raised up to the water surface. The number of columns is dependent on the size of the arrangement and the required stability with regard to wind and wave conditions at the place. In FIG. 12 an arrangement is shown with four columns. The height of the columns should be as high as the highest, expected water level. Even if the water level timewise should exceed the height of the columns and thereby surface water will come into the arrangement uncontrollably much, this does not matter much. No damages occur. Most often it is surface water which has the temperature which is the most desirable for the fenced area. According to FIG. 12 and FIG. 13 there are nets N1-N3 between the columns P1-P4 in which modules L1-L5, L6-L10, L11-L15 with turnable gates are mounted. One of these modules is shown more in detail in FIG. 14. The columns P1-P4 are made of a very hard, firm material where the uppermost part can be made of the same material or other than the lower part and is detachable in case there are troublesome ice conditions in the winter. These upper parts could then be removed. There can be one or several holes in the net and they can have any design (rectangular, elliptical, polygon or other fantasy shape). In FIG. 13 square shape has been chosen. The gates are closed or opened by hand or by motors built into the gates. In the first case the gates could be hinged in the modules L1-L15 with a simple bolt for locking. They can be loose and at the insertion fastened, by for instance a spring key. In the second case, shown in FIG. 14, a motor M is built into the gate LU, the motor being well capsuled. When the motor axis starts to move, the gate will turn in the frame R since the axis of the motor is fastened with splines in the frame of the gate. The gate LU can be hinged in the frame in any desired way, i.e. the angle and the position are free. Practically, to get space for axis and motor the most possible central passthrough is chosen. This choice of gate implies a vertical, lateral or towards the lateral line a 45° leaning joint where the joints are central normals of the horizontal, vertical sides and diagonal of the gate, respectively. In FIG. 14 the joint has been chosen horizontal. Each such frame with a gate L1-L15 is fastened in a square system made of corrosion proof material, i.e. reinforced glass-fibre, aluminum, stainless steel which is firm enough to resist the wind and wave conditions which can be counted upon. The number of modules L which are to be mounted is determined by the size of the arrangement and the passthrough speed requirement of the water. The modules are mounted in the square systems N1-N3 by for instance riveting or screw joints or any other mounting which makes it easy to substitute one element for another in case of faults, even so if all are to be assembled and disassembled for a season.

Figure 15:
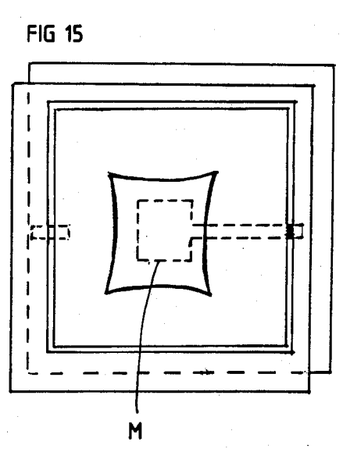
FIG. 15 shows the embodiment with the modules in an insertion variant.

The square system N1-N3 can be totally omitted if the modules L1-L15 are insertable in each other according to FIG. 15. The modules are anchored in the construction (between the columns and the horizontal foundation) with profiles which are firmly fastened in the construction. The profiles are open or sealed dependent on how the frame edges of the modules have been chosen, the edge sticking out or there is a notch in the edge. According to FIG. 15 it is chosen to make the module with edges sticking out, up and to the right while the left edge and the lower edge have notches in which the sticking out edge precisely fits by easy sliding. The whole built up module system is locked in the upper, open part by a profile which slides down into the sticking out edges of the uppermost modules. This profile is locked together with the vertical, upper ends of the profiles of the columns.

Each gate L1-L15 might have a temperature gauge on the surface which is located towards the sea. If the gates are operated manually regular thermometers are sufficient. If the gates are operated by motors the temperatures are forwarded to a central from where the motors are directed. Those gates are opened where the temperature in the surrounding water is the most convenient for the fenced area. The manual surveillance can be replaced by a computer which processes the information from the temperature gauges and controls the movements of the gates according to this information. The arrangement is completed by one or more draining holes in the foundation according to FIG. 13, passive or active depending on the desired speed to evacuate or absorb water. Passive is PA, active is AK:

All surfaces towards the surrounding water can have this formation of turning gates, Number, size and position of gates are determined by the flow and temperature conditions which are prevailing on the spot and at which speed the exchange of water shall have.

Figure 16:
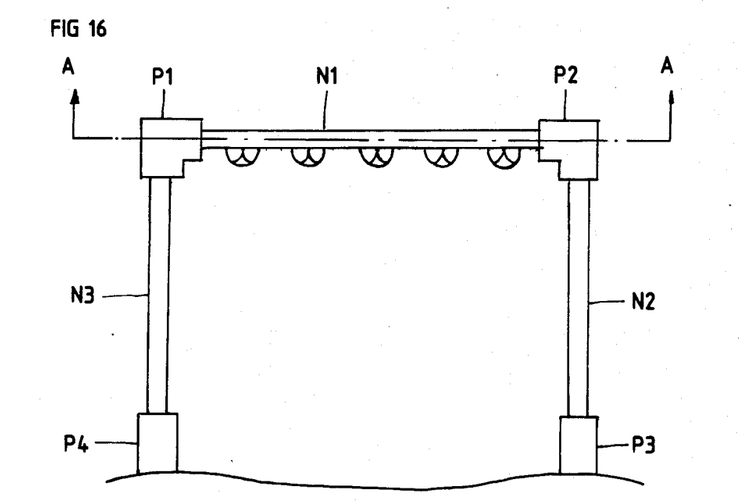
FIG. 16 shows the arrangement according to the invention in a fifth embodiment, seen from above.
Figure 17:
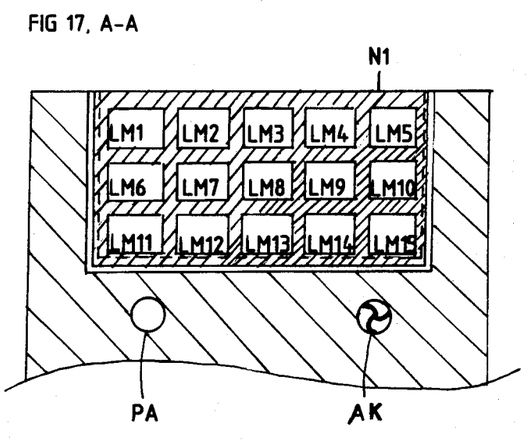
FIG. 17 shows a cross section of the same according to the arrows A—A in FIG. 16.

In a fifth embodiment a frame is built on the bottom (possibly a full foundation) from which columns rise towards the water surface. The number of columns is dependent on the size of the arrangement and the stability which is claimed with regard to wind and wave conditions on the spot. In FIG. 16, an arrangement is shown with four columns P1-P4. The height of the columns should be equally high as the highest, expected water level. Even if the water levell timewise should exceed the height of the columns and water thereby would come into the arrangement uncontrollably much, this does not harm. No damages occur. Most often it is the surface water which has the temperature which is the most appreciated for the fenced area. According to FIG. 16 there is a net N1 between the columns P1-P2 where the openings in the net N1 can have any shape (rectangular, ellipitical, polygon or other fantasy shape). In FIG. 17 a square has been chosen.

Figure 18:
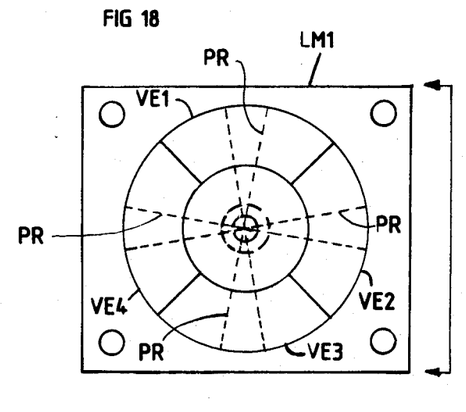
FIG. 18 shows a module, with motor and centrifugal governor.
Figure 19:
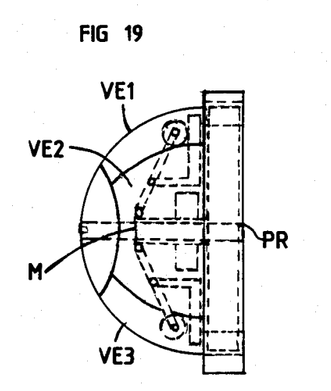
FIG. 19 shows the same module with motor and centrifugal governor in a view according to the indication in FIG. 18.

In these holes the modules LM1-LM15 are placed in which engine controlled propellers are mounted. The propeller can evacuate or absorb water in the arrangement depending on its direction or that the blades of the controller can be turned if the motor can rotate in only one direction. In FIG. 18 and FIG. 19 examples are shown how a motor with centrifugal governed valve can be designed. The centrifugal governor opens the valves VE1-VE4 independent on the direction of the motor. The blades of the propeller are marked with lines and named PR. The model according to this fifth alternative can be equipped with an active gate AK or a passive gate PA in the foundation. The position of the modules LM1-LM15 and the gates in the foundation are dependent on the conditions on the spot for the installation.

The modules LM1-LM15 should be easy to assemble and disassemble in case of service or use seasonwise. The modules can be made insertable in each other in the same manner as shown for the module L in the arrangement according to FIG. 15. The net N1 is replaced by profiles along the columns P and in the foundation added by a profile across through the uppermost row of the modules LM1–LM15, this uppermost profile being fastened in the upper part of the vertical profiles on the columns. The arrangement can be completed by temperature gauges towards the surrounding water at each module. The temperatures are forwarded to a central place where a person can start or stop the different propellers. A computer can be installed in the arrangement for automatic control of the propellers. All surfaces towards the surrounding water could have this arrangement of collection of modules LM1–LM15

Five different arrangements have been described which are based on the claims. Nothing prevents from an arrangement which combines the different embodiments described.

I claim:

1. An arrangement to increase or decrease the temperature in sea water within a limited water area, said arrangement being constituted by a basin-like construction built in the sea, the water temperature of which should be increased or decreased, said construction comprising a bottom part rigidly anchored in the bottom of the sea, column-like parts rigidly attached to and supported by said bottom part, said column-like parts to hold partitioning means in place in between, said column-like parts projecting in a vertical direction towards the water surface from said bottom part to form rigid corners of the basin-like construction, said partitioning means structured to hold wall elements which geographically separate the water inside and outside said basin-like construction, said wall elements being water-pervious to provide an exchange of the water inside and outside said basin-like construction.

2. An arrangement as claimed in claim 1 wherein said column-like parts are constituted by longitudinal profile elements having a certain cross-section, secured in a vertical direction to said bottom part, said wall elements consisting of porous floatable elements and each of said profile elements having a uniform profile shape throughout its whole length and at least partly enclosing a wall element in order to enable a free movement of the wall element in the longitudinal direction in dependence on the water level and a very limited movement in the lateral direction.

3. An arrangement as claimed in claim 2 wherein a number of said wall elements are arranged in each section defined by the cross-section of two adjacent profile elements, an expansion element being provided fastened to adjacent wall elements in the same section.

4. An arrangement as claimed in claim 1, wherein said column-like parts are arranged in a polygon, said wall means each consisting of a frame having a number of directed plates, each of said plates being rotateably secured in said frame to form a jalousie-like arrangement in order to controllably allow the water flow between the inside and the outside of the basin-like construction.

5. An arrangement as claimed in claim 1, wherein said bottom part is constituted by a scale rigidly anchored to the sea bottom, said column-like parts being integrated with said socle and forming a polygon, said wall means being constituted by a soft water-resistant sheet material provided with openings and by shaft means on the top and the bottom of said column-like parts in order to controllably roll said sheet material up and down and thus adjusting the level of said openings in relation to the sea water layers.

6. An arrangement as claimed in claim 1, wherein said bottom part is constituted by a rigidly anchored socle on the sea bottom, said column-like parts being integrated with said bottom part and forming a polygon, said wall means being constituted by a net fastened to said column-like parts, said net including controllably operable gate-modules for controlling the water flow between the inside and the outside of the basin-like construction.

7. An arrangement as claimed in claim 6, wherein at least one of said module gates has been substituted by a propeller means connected to the axis of a motor for controlling the water flow between the inside and the outside of the basin-like constructin, a centrifugal governor being connected to valve means for controlling said water flow independent of the direction of the water flow.

8. An arrangement as claimed in claim 1, wherein said bottom part is constituted by a foundation provided with a number of evacuation openings.

9. An arrangement as claimed in claim 8, wherein said evacuation openings are active.

10. An arrangement as claimed in claim 8, wherein said evacuation openings are passive.

11. An arrangement as claimed in claim 1, wherein temperature sensing means are provided on the outside of said partitioning means for sensing the temperature of the water outside the basin-like construction, computer means responsive to the sensed water temperature to deliver a control quantity, and control means for said wall elements to control the exchange of water between the outside and the inside of the basin-like construction in dependence of said control quantity.

* * * * *